Figure 1:
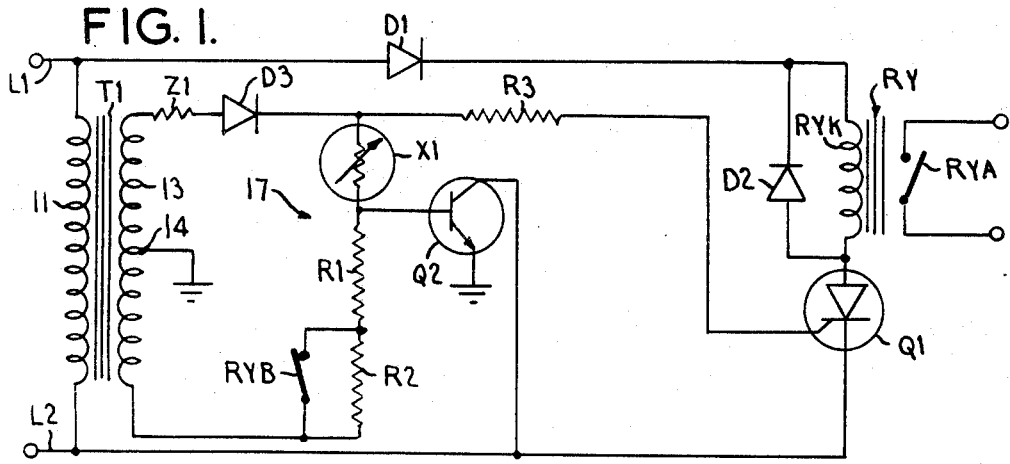

April 23, 1968     R. E. OBENHAUS     3,379,939

FAIL SAFE CONTROLLER

Filed Oct. 21, 1965

Robert E. Obenhaus,
Inventor.
Koenig, Senniger, Powers and Leavitt,
Attorneys.

United States Patent Office 3,379,939
Patented Apr. 23, 1968

3,379,939
FAIL SAFE CONTROLLER
Robert E. Obenhaus, South Easton, Mass., assignor to Texas Instruments, Incorporated, Dallas, Tex., a corporation of Delaware
Filed Oct. 21, 1965, Ser. No. 499,982
11 Claims. (Cl. 317—148.5)

This invention relates to a fail safe controller and more particularly to such a controller which is responsive to a variable resistance input and is fail safe when the input is shorted.

Thermistors are frequently used to sense the temperature of the windings of an electric motor and to actuate a motor protector or controller to deenergize the motor if it should overheat. As such a motor protector is in the nature of a safety device for the protection of the motor and associated equipment, it it highly desirable that such a protector be fail safe in the event of various possible malfunctions, including a shorting of the sensor input either by failure of the thermistor or by a crossing of the sensor leads.

Among the several objects of the invention may be noted the provision of a fail safe controller; the provision of a motor protector which is responsive to varying sensor resistance to deenergize the motor if it should overheat and will also deenergize the motor if the sensor circuit is short circuited; the provision of a controller which is fail safe for both open circuit and short circuit input conditions; the provisions of such a controller which will respond independently to a plurality of input sensors; the provision of such a controller which is reliable; and the provision of such a controller which is relatively simple and inexpensive. Other objects and features will be in part apparent and in part pointed out hereinafter.

Briefly, a fail safe controller according to the present invention includes a silicon controlled rectifier and means for connecting the anode-cathode circuit of the rectifier with a load for selectively switching the flow of electric power from an A.C. source to the load. The controller includes also a voltage divider having a sensing impedance serially connected with a reference impedance. The primary winding of a transformer is connected to the same A.C. source as the load circuit. The transformer includes a tapped secondary winding which is interconnected in a secondary winding circuit for applying A.C. to the divider in phase with the A.C. applied to the power circuit. The secondary winding circuit includes substantial source impedance in series with the divider. The emitter terminal of a transistor is connected to the secondary winding tap and the base terminal of the transistor is connected to the voltage divider at a junction between the reference impedance and the sensing impedance, conduction in the collector-emitter circuit of the transistor thereby being a function of the relative impedance values of the reference impedance and the sensing impedance. The gate-cathode circuit of the silicon controlled rectifier is connected between the end of said sensing impedance which is opposite said junction and the collector terminal of the transistor for applying triggering current to the rectifier under control of the transistor whereby shorting of the sensing impedance effectively shunts the gate-cathode circuit of the silicon controlled rectifier and thereby deenergizes the load.

The invention accordingly comprises the apparatus hereinafter described, the scope of the invention being indicated in the following claims.

Figure 2:
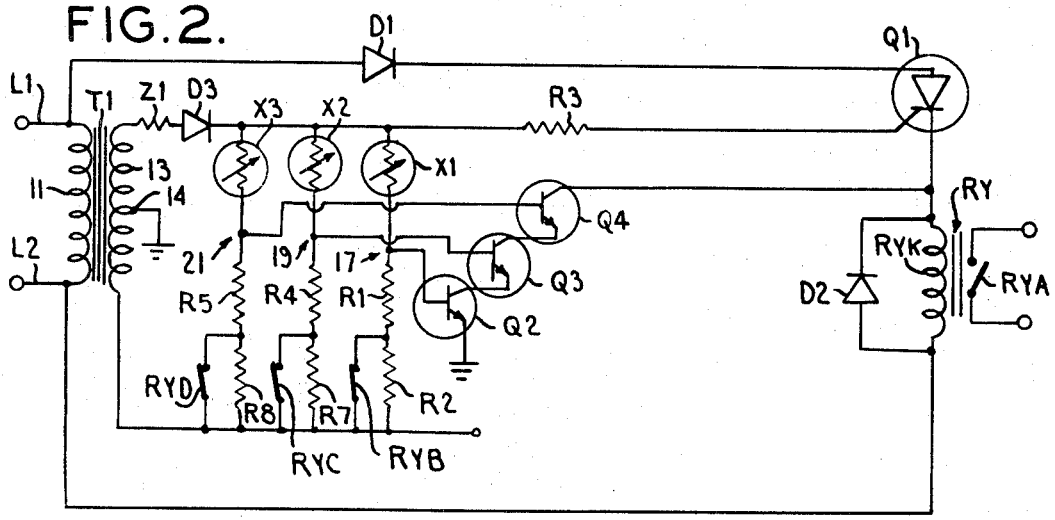

In the accompanying drawings, in which several of various possible embodiments of the invention are illustrated, FIG. 1 is a schematic circuit diagram of a fail safe controller of the present invention; and FIG. 2 is a schematic circuit diagram of another embodiment of the invention which is responsive to a plurality of input sensors.

Corresponding reference characters indicate corresponding parts throughout the several views of the drawings.

Referring now to FIG. 1, there is shown a controller which is useful as a thermal overload protector for electric induction motors. A.C. power for energizing the controller is obtained through a pair of leads L1 and L2 from a suitable source or supply (not shown). The coil RYK of a relay RY is connected across lines L1 and L2 by means of a power circuit including the anode-cathode circuit of an SCR (silicon controlled rectifier) Q1 which controls the energization of the relay by switching the flow of power thereto and a diode D1 which isolates coil RYK from line L1 on those A.C. half cycles during which the SCR Q1 is reverse-biased and cannot conduct. A pair of normally open contacts RYA, operated by coil RYK, are provided for energizing an external load, such as an induction motor, when the relay RY is energized. A freewheeling diode D2 shunts coil RYK in a conventional manner for the purpose of eliminating chatter on alternate A.C. half cycles when SCR Q1 is reverse-biased.

The primary winding 11 of a transformer T1 is also connected across the supply leads L1 and L2. Transformer T1 includes a secondary winding 13 which is limited in current-carrying capacity so as to present a relatively high source impedance. This source impedance is indicated in FIG. 1 as a lumped circuit element Z1 even though, as will be understood by those skilled in the art, this impedance may in fact be distributed throughout the secondary winding or may be constituted by losses in the coupling between windings 11 and 13. Winding 13 is provided with an intermediate tap, e.g., a center tap 14, which is grounded.

Connected across the entire secondary winding 13 is a voltage divider 17 which includes a pair of serially connected resistors R1 and R2 and a sensor or sensing impedance X1. A diode D3 isolates the sensor end of voltage divider 17 from the respective end of secondary winding 13 on those A.C. half cycles during which SCR Q1 is reverse-biased. Resistor R2 is selectively shunted by a set of normally closed contacts RYB which are opened by energization of coil RYK.

The junction between the sensing impedance X1 and the resistor R1 is connected to the base terminal of an NPN transistor Q2. The emitter terminal of this transistor is grounded and is thus, through ground, connected to the center tap of winding 13. The collector terminal of transistor Q2 is connected directly to the cathode of SCR Q1. The gate of SCR Q1 is connected, through a current limiting resistor R3, to the sensor end of voltage divider 17 and hence also, through diode D3 and the distributed source impedance Z1, to one end of secondary winding 13.

The operation of this circuit is as follows, only those A.C. half cycles during which SCR Q1 is forward-biased being considered. Due to the isolating effect of transformer T1, the voltage divider circuitry is floating with respect to the power circuit. It can thus be seen that triggering current is provided to the gate-collector circuit of SCR Q1 from secondary winding 13 only when the emitter-collector circuit of transistor Q2 is conducting. The circuit through which this triggering current flows extends from the upper end of secondary winding 13 through source impedance Z1, diode D3 and resistor R3 to the gate of SCR Q1. The cathode side of the gate-cathode circuit is connected through the collector-emitter circuit of transistor Q1 to ground and, through ground, to the center tap of secondary winding 13 thereby completing the triggering current path.

The center-tapped secondary winding 13 and voltage divider 17 constitute a sort of bridge circuit which controls conduction in transistor Q2. As the center tap of winding 13 and the emitter of transistor Q2 are both connected to ground, transistor Q2 will be forward-biased when the sensing impedance X1 is less than the impedance of resistor R1 which thus constitutes a reference impedance. When transistor Q2 is forward-biased, its emitter-collector circuit conducts and triggering current is applied to the gate-cathode circuit of SCR Q1 is thus triggered, its anode-cathode circuit conducts and the relay coil RYK is energized thereby actuating normally open contacts RYA and normally closed contacts RYB to their respectively opposite conditions.

The opening of contacts RYB effectively inserts resistor R2 into the voltage divider 17 thereby producing a regenerative shift in the balance of the voltage divider and increasing the forward biasing of transistor Q2. Accordingly, the sensing impedance X1 must increase to a value which is appreciably greater than that which initially triggered the controller before the circuit will rivert to its original condition. Resistor R2 thus constitutes a portion of the total possible reference impedance. The alternate shunting of this portion of the reference impedance introduces a differential into the operation of the control circuit, which differential prevents instability and chattering of relay RY.

In using this controller as a motor protector the relay contacts RYA are connected to a motor contactor for energizing the motor when relay RY is energized. The sensor impedance X1 is constituted by a PTC (positive temperature coefficient) thermistor embedded in the motor windings. When the motor is cool, the sensing impedance X1 will therefore have a relatively low resistance so that voltage divider 17 forward-biases transistor Q2. Conduction in transistor Q2 causes SCR Q1 to be triggered and relay RY to be energized so as to close contacts RYA. Accordingly, it can be seen that power can be applied to the motor when it is relatively cool. On the other hand, if the motor overheats so that the resistance of the thermistor constituting impedance X1 rises to a relatively high value, the transistor Q2 will be cut off, the SCR Q1 will not conduct and relay RY will be deenergized thereby allowing contacts RYA to open and disconnect the motor from its source of power. The motor is in this way protected from overheating which could damage the insulation of the windings.

From the above description of the operation of the controller, it can be readily understood that the controller is fail safe in a situation in which the sensor X1 becomes open circuited since an open circuit in place of sensor X1 would merely increase the tendency of voltage divider 17 to reverse-bias transistor Q2. On the other hand, this control circuit is also fail safe with respect to short circuiting of the sensor X1 because of the appreciable source impedance Z1 included in the secondary winding circuit of transformer T1. As noted previously, the triggering current supplied to the gate-cathode circuit of SCR Q1 is obtained from the upper end of voltage divider 17, that is, the end which is opposite the junction between the sensing impedance and the reference impedance, and hence only indirectly from the upper portion of secondary winding 13. When the sensing impedance X1 is shorted this portion of the secondary winding circuit is presented with a very low impedance load (the short circuit and the base-emitter junction of transistor Q2) as compared with the substantial source impedance Z1. Accordingly, when the sensing impedance X1 is shorted, virtually no voltage appears at the sensor end of the voltage divider 17 and there is thus virtually no source of triggering current to energize SCR Q1. Accordingly, even though low values of sensing impedance are required to energize transistor Q2 and SCR Q1, a complete short circuit of the sensing impedance X1 will deenergize the SCR. This control circuit is therefore fail safe for complete shorts of the sensing impedance X1 or its connecting leads. It will be noted also that this control circuit will be fail safe for partial short circuits of the sensing impedance.

As energization of the motor or other load depends upon energization of relay RY, it can also be seen that the controller is fail safe for loss of supply power to the leads L1 and L2 or to open circuits in either the SCR Q1 or the transistor Q2.

While the source impedance Z1 has been considered in the preceding description as an inherent or distributed characteristic of secondary winding 13, it should be understood that this impedance may also be constituted by a discrete element which is added to the secondary winding circuit to render the voltage supplied to the divider relatively dependent on the sensor impedance which loads this source impedance.

The controller of the present invention may also be operated in response to a plurality of variable resistance inputs each of which exercises an independent control over the protected apparatus. That is, each sensor has the power to deenergize that apparatus. This is exemplified by the circuit illustrated in FIG. 2 which is essentially similar in operation to that shown in FIG. 1 but there are there similar voltage dividers 17, 19 and 21 connected across the secondary winding circuit of transformer T1 in place of the single divider of the previously described circuit. The dividers include respective sensing impedances X1, X2 and X3, reference resistors R1, R4 and R5 and differential resistors R2, R7 and R8. In the FIG. 2 circuit, relay coil RYK operates two additional sets of normally closed contacts RYC and RYD in addition to the contacts RYA and RYC described previously. These additional contacts shunt the resistors R7 and R8 except when coil RYK is energized.

In the FIG. 2 circuit, SCR Q1 and coil RYK are reversed in position in the power circuit but since the power circuit is isolated from the divider circuitry by transformer T1, this interchange does not affect the operation of the circuit. The cathode of SCR Q1 is connected to ground through a circuit which includes the collector-emitter circuits of three NPN transistors Q2, Q3 and Q4, connected in series. The base terminal of each transistor is connected to a respective voltage divider at a point between the sensing impedance and the reference resistor.

The operation of the circuit of FIG. 2 is as follows, again only those A.C. half cycles which forward bias SCR Q1 being considered. Due to the isolation provided by transformer T1, triggering current can be applied to the gate-cathode circuit of SCR Q1 only through a path which includes the emitter-collector circuits of all three transistors Q2, Q3 and Q4. Accordingly, relay RY is energized only when all three transistors are conducting. This condition is met when the impedance of each of the sensing impedances X1, X2 and X3 is greater than the resistance of its respective reference resistors R1, R4 and R5. In this case transistor Q2 is forward-biased as described previously. Conduction in the emitter-collector circuit of transistor Q2 pulls the potential at the emitter of transistor Q3 down substantially to ground potential. Voltage divider 19 therefore forward-biases transistor Q3 which in turn pulls the emitter of transistor down to substantially ground potential. Voltage divider 21 is then capable of forward-biasing Q4 thereby completing a conductive triggering circuit between the upper portion of secondary winding 13 and the gate-cathode circuit of SCR Q1. Energization of relay RY by SCR Q1 opens the normally closed contacts RYB, RYC and RYD so that a stabilizing differential is established in the balance of the respective voltage dividers as explained previously.

If, however, the resistance of any one of the sensing impedances X1, X2 or X3 subsequently increases to a value greater than that of the respective reference and differential resistors, the respective transistor is cut off and the circuit supplying triggering current to the gate-cathode circuit of SCR Q1 is broken. SCR Q1 therefore deenergizes relay RY allowing contacts RYA to open and deenergize the ultimate load. It should be noted that the control exercised by each of the sensors X1, X2 and X3 is essentially independent in that each sensor has the power to deenergize the load without regard for the conditions influencing any of the other sensors. It should also be noted that the circuit of FIG. 2 is fail safe in response to a short circuit occurring at any one of the sensors in the same manner as the circuit of FIG. 1. If any one of the sensing impedances X1, X2 and X3 should become shorted, the source impedance Z1 will be so loaded that virtually no voltage will be available to trigger SCR Q1.

While PTC thermistors have been disclosed by way of illustration, it should be understood that NTC thermistors or other types of sensors may be used with the controller of the present invention. Similarly PNP transistors may be used in place of the NPN transistors shown and various other substitutions and variations may be made within the capability of one skilled in the art, e.g., the SCR may energize the load directly without the use of a relay.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:

1. A fail safe controller which is responsive to changes in the impedance of a sensor for selectively energizing a load, said controller comprising:
   a power circuit including a silicon controlled rectifier and means for interconnecting the anode-cathode circuit of said rectifier with said load for selectively switching the flow of electric power thereto;
   means for connecting said power circuit to an A.C. source;
   a voltage divider including a sensing impedance serially connected with a reference impedance;
   a transformer including a primary winding connected to said source and a secondary winding having an intermediate tap;
   a secondary winding circuit including said secondary winding for applying A.C. to said divider in phase with the A.C. applied to said power circuit, said secondary winding circuit including substantial source impedance in series with said divider;
   a transistor the emitter terminal of which is connected to said intermediate tap and the base terminal of which is connected to said voltage divider at a junction between said reference impedance and said sensing impedance, conduction in the collector-emitter circuit of said transistor thereby being a function of the relative impedance values of said reference impedance and said sensing impedance; and
   circuit means connecting the gate-cathode circuit of said silicon controlled rectifier between the end of said sensing impedance which is opposite said junction and the collector terminal of said transistor for providing triggering current to said silicon controlled rectifier under control of said transistor whereby shorting of said sensing impedance shunts the gate-cathode circuit of said silicon controlled rectifier thereby deenergizing said load.

2. A controller as set forth in claim 1 including a relay having an actuating winding which is connected in series with the anode-cathode circuit of said silicon controlled rectifier, said relay including contacts for selectively energizing said load.

3. A controller as set forth in claim 2 wherein said relay includes contacts for selectively shunting a portion of said reference impedance thereby to provide a differential in the response of said controller.

4. A controller as set forth in claim 2 wherein said relay winding constitutes an inductive impedance and is shunted by a diode.

5. A controller as set forth in claim 1 wherein said end of said sensing impedance is connected to the gate of said silicon controlled rectifier and said transistor is of the NPN type whereby said load is energizable on those half cycles of A.C. power during which said end is positive with respect to said intermediate tap.

6. A controller as set forth in claim 5 including a current limiting resistor in series with the gate of said silicon controlled rectifier.

7. A controller as set forth in claim 5 including a diode for isolating said power circuit from said source on A.C. half cycles of opposite polarity.

8. A controller as set forth in claim 5 including a diode for isolating said voltage divider from said secondary winding on A.C. half cycles of opposite polarity.

9. A controller as set forth in claim 1 which includes a plurality of voltage dividers each having respective sensing impedances and reference impedances, and which also includes a plurality of transistors the base terminals of which are connected to said voltage dividers at junctions between the respective reference and sensing impedances thereof.

10. A controller as set forth in claim 9 wherein the emitter-collector circuits of said transistors are connected in series with each other and with the gate-cathode circuit of said silicon controlled rectifier.

11. A fail safe controller which is responsive to changes in the resistance of a sensor for selectively energizing a load, said controller comprising:
   a relay having an actuating winding and contacts for energizing said load when said winding is energized;
   a silicon controlled rectifier, the anode-cathode circuit of which is connected in series with said winding;
   means for connecting said serially connected rectifier and winding across an A.C. source;
   a voltage divider including in series connection a sensing resistance, a reference resistance and a differential resistance, said relay including contacts for shunting said differential resistance when said winding is deenergized;
   a transformer including a primary winding connected to said source and a center-tapped secondary winding;
   a secondary winding circuit including said secondary winding for applying A.C. to said divider in phase with the A.C. applied to said power circuit, said secondary winding circuit including substantial source impedance in series with said divider;
   an NPN transistor the emitter terminal of which is connected to the center tap of said secondary winding and the base terminal of which is connected to said voltage divider at a junction between said reference resistance and said sensing resistance, conduction in the collector-emitter circuit of said transistor thereby being a function of the relative resistance values of said reference resistance and said sensing resistance; and
   circuit means including a current limiting resistor connecting the gate-cathode circuit of said silicon controlled rectifier between the end of said sensing resistance which is opposite said junction and the collector terminal of said transistor for providing triggering current to said silicon controlled rectifier under control of said transistor whereby shorting of said sensing resistance shunts the gate-cathode circuit of said silicon controlled rectifier thereby de-energizing said load.

References Cited

UNITED STATES PATENTS

| 3,032,690 | 5/1962 | Elliot | 317—13 X |
|---|---|---|---|
| 3,262,014 | 7/1966 | Conner | 317—41 X |
| 3,329,869 | 7/1967 | Obenhaus. | |

LEE T. HIX, *Primary Examiner.*